(12) United States Patent  
Morris

(10) Patent No.: US 8,773,251 B2  
(45) Date of Patent: Jul. 8, 2014

(54) METHODS, SYSTEMS, AND COMPUTER PROGRAM PRODUCTS FOR MANAGING OPERATION OF AN AUTOMOTIVE VEHICLE

(75) Inventor: Robert Paul Morris, Raleigh, NC (US)

(73) Assignee: Sitting Man, LLC, Raleigh, NC (US)

( * ) Notice: Subject to any disclaimer, the term of this patent is extended or adjusted under 35 U.S.C. 154(b) by 652 days.

(21) Appl. No.: 13/024,466

(22) Filed: Feb. 10, 2011

(65) Prior Publication Data

US 2012/0206255 A1 Aug. 16, 2012

(51) Int. Cl.
*B60Q 1/00* (2006.01)
(52) U.S. Cl.
USPC ....... 340/439; 340/576; 455/41.2; 455/414.1; 455/418
(58) Field of Classification Search
USPC .............. 340/425.5, 439, 468, 438, 575, 576; 455/1, 422, 517, 67.7, 418, 414.1
See application file for complete search history.

(56) References Cited

U.S. PATENT DOCUMENTS

| | | | |
|---|---|---|---|
| 4,275,378 A | 6/1981 | Henderson | |
| 4,500,868 A | 2/1985 | Tokitsu et al. | |
| 4,716,458 A | 12/1987 | Heitzman et al. | |
| 4,933,852 A | 6/1990 | Lemelson | |
| 4,945,759 A | 8/1990 | Krofchalk et al. | |
| 5,034,894 A | 7/1991 | Abe | |
| 5,074,144 A | 12/1991 | Krofchalk et al. | |
| 5,150,609 A | 9/1992 | Ebner et al. | |
| 5,207,095 A | 5/1993 | Teare et al. | |
| 5,390,117 A | 2/1995 | Graf et al. | |
| 5,465,079 A | 11/1995 | Bouchard et al. | |
| 5,499,182 A | 3/1996 | Ousborne | |
| 5,661,454 A | 8/1997 | Bezard | |
| 5,769,085 A | 6/1998 | Kawakami et al. | |
| 5,850,176 A | 12/1998 | Kinoshita | |
| 6,025,775 A | 2/2000 | Erlandson | |
| 6,225,897 B1 * | 5/2001 | Doyle et al. | 340/468 |
| 6,249,720 B1 | 6/2001 | Kubota et al. | |
| 6,262,657 B1 * | 7/2001 | Okuda et al. | 340/439 |
| 6,268,803 B1 | 7/2001 | Gunderson et al. | |

(Continued)

FOREIGN PATENT DOCUMENTS

| | | |
|---|---|---|
| EP | 0 825 568 | 2/1998 |
| JP | 01195139 | 8/1989 |

(Continued)

OTHER PUBLICATIONS

Office Action Summary from U.S. Appl. No. 13/024,444 dated Jan. 31, 2014.

(Continued)

*Primary Examiner* — Brent Swarthout
(74) *Attorney, Agent, or Firm* — Patrick E. Caldwell, Esq.; The Caldwell Firm, LLC

(57) ABSTRACT

Methods and systems are described for managing operation of an automotive vehicle. Vehicle information, about an automotive vehicle, is received. The automotive vehicle has a current operational configuration for constraining an operation of the automotive vehicle. Device information, about a portable electronic device, is received. A detection is made, based on the vehicle information and the device information, that an operator of the automotive vehicle is a device user of the portable electronic device. In response to the detection, change information is sent to change the current operational configuration to alter a constraint on the operation of the automotive vehicle.

24 Claims, 7 Drawing Sheets

(56) References Cited

U.S. PATENT DOCUMENTS

| | | |
|---|---|---|
| 6,272,411 B1 | 8/2001 | Corrado et al. |
| 6,285,930 B1 | 9/2001 | Dickson et al. |
| 6,306,063 B1 | 10/2001 | Horgan et al. |
| 6,353,778 B1* | 3/2002 | Brown .............................. 701/1 |
| 6,356,812 B1 | 3/2002 | Cragun |
| 6,370,454 B1 | 4/2002 | Moore |
| 6,496,117 B2 | 12/2002 | Gutta |
| 6,564,127 B1 | 5/2003 | Bauerle et al. |
| 6,685,281 B2* | 2/2004 | MacGregor et al. .......... 303/123 |
| 6,724,538 B2 | 4/2004 | Kushida |
| 6,909,947 B2 | 6/2005 | Douros et al. |
| 6,927,694 B1 | 8/2005 | Smith |
| 7,027,621 B1 | 4/2006 | Prokoski |
| 7,138,922 B2 | 11/2006 | Strumolo et al. |
| 7,174,248 B2 | 2/2007 | Suzuki |
| 7,260,458 B2 | 8/2007 | Kato |
| 7,403,124 B2 | 7/2008 | Arakawa |
| 7,427,913 B2 | 9/2008 | Maron |
| 7,528,731 B2 | 5/2009 | Zhang |
| 7,598,927 B2 | 10/2009 | Yamazaki |
| 7,705,738 B2 | 4/2010 | Fukaya |
| 7,710,243 B2 | 5/2010 | Akatsuka |
| 7,859,413 B2 | 12/2010 | Nguyen |
| 8,022,831 B1 | 9/2011 | Wood-Eyre |
| 8,075,484 B2 | 12/2011 | Moore-Ede |
| 8,154,393 B2* | 4/2012 | Breiner ..................... 340/425.5 |
| 8,401,578 B2 | 3/2013 | Inselberg |
| 8,519,853 B2 | 8/2013 | Eskandarian et al. |
| 8,594,705 B2 | 11/2013 | Osann, Jr. |
| 2001/0056544 A1 | 12/2001 | Walker |
| 2002/0032510 A1 | 3/2002 | Turnbull et al. |
| 2002/0103622 A1 | 8/2002 | Burge |
| 2003/0014176 A1 | 1/2003 | Levine |
| 2005/0255874 A1 | 11/2005 | Stewart-Baxter |
| 2007/0072616 A1 | 3/2007 | Irani |
| 2008/0080741 A1 | 4/2008 | Yokoo |
| 2008/0266552 A1 | 10/2008 | Malawey |
| 2009/0215466 A1 | 8/2009 | Ahl et al. |
| 2009/0271002 A1 | 10/2009 | Asofsky |
| 2010/0009626 A1 | 1/2010 | Farley |
| 2010/0156617 A1 | 6/2010 | Nakada |
| 2010/0198491 A1 | 8/2010 | Mays |
| 2010/0222976 A1* | 9/2010 | Haug .............................. 701/70 |
| 2011/0115618 A1* | 5/2011 | Catten et al. ................. 340/439 |
| 2011/0136509 A1 | 6/2011 | Osann, Jr. |
| 2012/0021717 A1 | 1/2012 | Schmidt |
| 2012/0092148 A1 | 4/2012 | Santos |

FOREIGN PATENT DOCUMENTS

| | | |
|---|---|---|
| JP | 10-313359 | 11/1998 |
| JP | WO 00/07150 | 2/2000 |
| WO | WO 92/03803 | 3/1992 |
| WO | WO 00/07150 | 2/2000 |
| WO | WO 00/31712 | 6/2000 |
| WO | WO 00/34742 | 6/2000 |
| WO | WO 00/55000 | 9/2000 |

OTHER PUBLICATIONS

Ford, "Ford Technology Newsbrief Aug. 2010," Aug. 2010.

Daimler, "Attention Assist: Drowsiness-detection system warns drivers to prevent them falling asleep momentarily," Nov. 12, 2008, http://media.daimler.com/dcmedia/0-921-658892-1-1147698-1-0-0-1147922-0-1-11702-0-0-1-0-0-0-0-0.html?TS=1266506682902, last accessed Nov. 26, 2013.

VW, "Driver Alert," http://www.volkswagen.co.uk/new/passat-vii/explore/experience/driver-assistance/driver-alert, last accessed Nov. 26, 2013.

How stuff works, "Will your next car wake you up when you fall asleep at the wheel?," Dec. 9, 2009, http://web.archive.org/web/20091206040143/http:/auto.howstuffworks.com/car-driving-safety/safety-regulatory-devices/car-wake-you-up1.htm, last accessed Nov. 26, 2013.

www.newcarnet.co.uk, "LS460 achieves a world-first in preventative safety," Aug. 30, 2006, http://web.archive.org/web/20101006054727/http://www.newcarnet.co.uk/Lexus_news.html?id=5787, last accessed Nov. 26, 2013.

www.worldcarfans.com, "Toyota Redesigns Crown & Introduces Hybrid Model," Feb. 19, 2008, http://www.worldcarfans.com/10802192219/toyota-redesigns-crown—introduces-hybrid-model, last accessed Nov. 26, 2013.

Office Action Summary in U.S. Appl. No. 13/025,939 dated Jun. 26, 2013.

Office Action Summary in U.S. Appl. No. 13/025,939 dated Dec. 26, 2013.

* cited by examiner

METHODS, SYSTEMS, AND COMPUTER PROGRAM PRODUCTS FOR MANAGING OPERATION OF AN AUTOMOTIVE VEHICLE

RELATED APPLICATIONS

This application is related to the following commonly owned U.S. patent applications, the entire disclosures being incorporated by reference herein: application Ser. No. 13/023,883 filed on 2011/02/09, entitled "Methods, Systems, and Program Products for Directing Attention of an Occupant of an Automotive Vehicle to a Viewport";

Application Ser. No. 13/023,916 filed on 2011/02/09, entitled "Methods, Systems, and Program Products for Directing Attention to a Sequence of Viewports of an Automotive Vehicle";

Application Ser. No. 13/024,444 filed on 2011/02/10 entitled "0Methods, Systems, and Program Products for Managing Operation of a Portable Electronic Device";

Application Ser. No. 13/023,932 filed on 2011/02/09, entitled "Methods, Systems, and Program Products for Altering Attention of an Automotive Vehicle Operator"; and Application Ser. No. 13/023,952 filed on 2011/02/09, entitled "Methods, Systems, and Program Products for Managing Attention of an Operator of an Automotive Vehicle".

BACKGROUND

Driving while distracted is a significant cause of highway accidents. Recent attention to the dangers of driving while talking on a phone and/or driving while "texting" have brought the public's attention to this problem. While the awareness is newly heightened the problem is quite old. Driving while eating, adjusting a car's audio system, and even talking to other passengers can and does take drivers' attention away from driving, thus creating and/or otherwise increasing risks.

A need exists to assist drivers in focusing their attention where it is needed to increase highway safety as well as a need for automotive vehicles to respond when a driver is not paying sufficient attention. Accordingly, there exists a need for methods, systems, and computer program products for managing operation of an automotive vehicle.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and systems are described for managing operation of an automotive vehicle. In one aspect, the method includes receiving vehicle information about an automotive vehicle, wherein the automotive vehicle has a current operational configuration for constraining a first operation of the automotive vehicle. The method further includes receiving device information about a portable electronic device. The method still further includes detecting, based on the vehicle information and the device information, that an operator of the automotive vehicle is a device user of the portable electronic device. The method also includes sending, in response to detecting that the vehicle operator is the device user, change information to change the current operational configuration to alter a constraint on the first operation of the automotive vehicle.

Further, a system for managing operation of an automotive vehicle is described. The system includes an operator identity component, a user identity component, a match component, and an operation director component adapted for operation in an execution environment. The system includes the operator identity component configured for receiving vehicle information about an automotive vehicle, wherein the automotive vehicle has a current operational configuration for constraining a first operation of the automotive vehicle. The system further includes the user identity component configured for receiving device information about a portable electronic device. The system still further includes the match component configured for detecting, based on the vehicle information and the device information, that an operator of the automotive vehicle is a device user of the portable electronic device. The system still further includes the operation director component configured for sending, in response to detecting that the vehicle operator is the device user, change information to change the current operational configuration to alter a constraint on the first operation of the automotive vehicle.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which.

DETAILED DESCRIPTION

Figure 1:
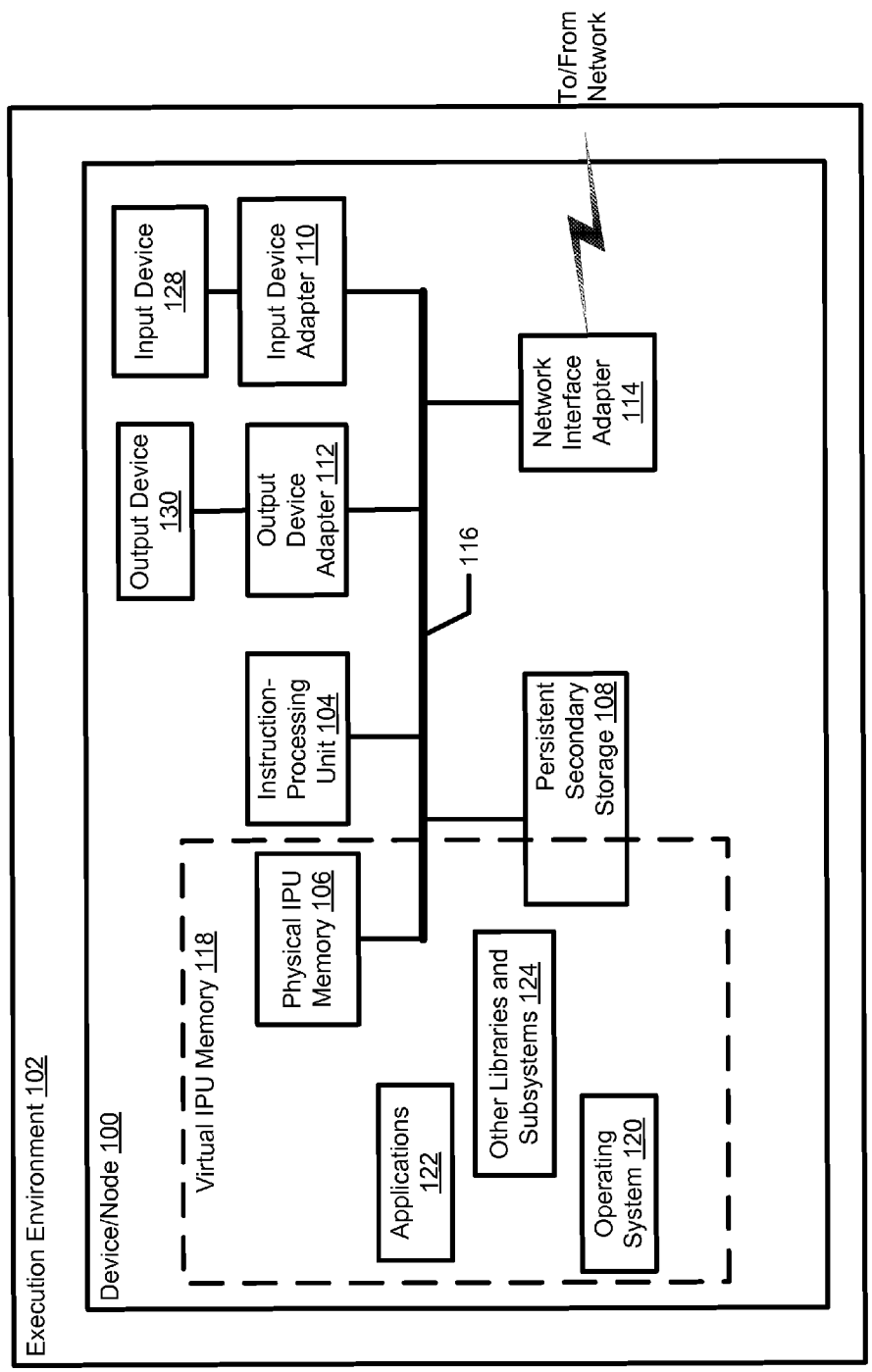
FIG. 1 is a block diagram illustrating an exemplary execution environment in which the subject matter may be implemented.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure.

An exemplary device included in an execution environment that may be configured according to the subject matter is illustrated in FIG. 1. An execution environment includes an arrangement of hardware and, in some aspects, software that may be further configured to include an arrangement of components for performing a method of the subject matter described herein. An execution environment includes and/or is otherwise provided by one or more devices. An execution environment may include a virtual execution environment including software components operating in a host execution environment. Exemplary devices included in and/or otherwise providing suitable execution environments for configuring according to the subject matter include an automobile, a truck, a van, and/or sports utility vehicle. Alternatively or additionally a suitable execution environment may include and/or may be included in a personal computer, a notebook computer, a tablet computer, a server, a portable electronic device, a handheld electronic device, a mobile device, a multiprocessor device, a distributed system, a consumer electronic device, a router, a communication server, and/or any other suitable device. Those skilled in the art will understand that the components illustrated in FIG. 1 are exemplary and may vary by particular execution environment.

FIG. 1 illustrates hardware device 100 included in execution environment 102. FIG. 1 illustrates that execution environment 102 includes instruction-processing unit (IPU) 104, such as one or more microprocessors; physical IPU memory 106 including storage locations identified by addresses in a physical memory address space of IPU 104; persistent secondary storage 108, such as one or more hard drives and/or flash storage media; input device adapter 110, such as a key or keypad hardware, a keyboard adapter, and/or a mouse adapter; output device adapter 112, such as a display and/or an audio adapter for presenting information to a user; a network interface component, illustrated by network interface adapter 114, for communicating via a network such as a LAN and/or WAN; and a communication mechanism that couples elements 104-114, illustrated as bus 116. Elements 104-114 may be operatively coupled by various means. Bus 116 may comprise any type of bus architecture, including a memory bus, a peripheral bus, a local bus, and/or a switching fabric.

IPU 104 is an instruction execution machine, apparatus, or device. Exemplary IPUs include one or more microprocessors, digital signal processors (DSPs), graphics processing units, application-specific integrated circuits (ASICs), and/or field programmable gate arrays (FPGAs). In the description of the subject matter herein, the terms "IPU" and "processor" are used interchangeably. IPU 104 may access machine code instructions and data via one or more memory address spaces in addition to the physical memory address space. A memory address space includes addresses identifying locations in a processor memory. The addresses in a memory address space are included in defining a processor memory. IPU 104 may have more than one processor memory. Thus, IPU 104 may have more than one memory address space. IPU 104 may access a location in a processor memory by processing an address identifying the location. The processed address may be identified by an operand of a machine code instruction and/or may be identified by a register or other portion of IPU 104.

FIG. 1 illustrates virtual IPU memory 118 spanning at least part of physical IPU memory 106 and at least part of persistent secondary storage 108. Virtual memory addresses in a memory address space may be mapped to physical memory addresses identifying locations in physical IPU memory 106. An address space for identifying locations in a virtual processor memory is referred to as a virtual memory address space; its addresses are referred to as virtual memory addresses; and its IPU memory is referred to as a virtual IPU memory or virtual memory. The terms "IPU memory" and "processor memory" are used interchangeably herein. Processor memory may refer to physical processor memory, such as IPU memory 106, and/or may refer to virtual processor memory, such as virtual IPU memory 118, depending on the context in which the term is used.

Physical IPU memory 106 may include various types of memory technologies. Exemplary memory technologies include static random access memory (SRAM) and/or dynamic RAM (DRAM) including variants such as dual data rate synchronous DRAM (DDR SDRAM), error correcting code synchronous DRAM (ECC SDRAM), RAMBUS DRAM (RDRAM), and/or XDR™ DRAM. Physical IPU memory 106 may include volatile memory as illustrated in the previous sentence and/or may include nonvolatile memory such as nonvolatile flash RAM (NVRAM) and/or ROM.

Persistent secondary storage 108 may include one or more flash memory storage devices, one or more hard disk drives, one or more magnetic disk drives, and/or one or more optical disk drives. Persistent secondary storage may include a removable medium. The drives and their associated computer-readable storage media provide volatile and/or nonvolatile storage for computer-readable instructions, data structures, program components, and other data for execution environment 102.

Execution environment 102 may include software components stored in persistent secondary storage 108, in remote storage accessible via a network, and/or in a processor memory. FIG. 1 illustrates execution environment 102 including operating system 120, one or more applications 122, and other program code and/or data components illustrated by other libraries and subsystems 124. In an aspect, some or all software components may be stored in locations accessible to IPU 104 in a shared memory address space shared by the software components. The software components accessed via the shared memory address space are stored in a shared processor memory defined by the shared memory address space. In another aspect, a first software component may be stored in one or more locations accessed by IPU 104 in a first address space and a second software component may be stored in one or more locations accessed by IPU 104 in a second address space. The first software component is stored in a first processor memory defined by the first address space and the second software component is stored in a second processor memory defined by the second address space.

Software components typically include instructions executed by IPU 104 in a computing context referred to as a "process". A process may include one or more "threads". A "thread" includes a sequence of instructions executed by IPU 104 in a computing sub-context of a process. The terms "thread" and "process" may be used interchangeably herein when a process includes only one thread.

Execution environment 102 may receive user-provided information via one or more input devices illustrated by input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding communication interfaces such as a serial port, a parallel port, and/or a universal serial bus (USB) port. Input device adapter 110 receives input and provides a representation to bus 116 to be received by IPU 104, physical IPU memory 106, and/or other components included in execution environment 102.

Output device 130 in FIG. 1 exemplifies one or more output devices that may be included in and/or that may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an input device may also include an output device. Examples include a phone, a joystick, and/or a touch screen. In addition to various types of display devices, exemplary output devices include printers, speakers, tactile output devices such as motion-producing devices, and other output devices producing sensory information detectable by a user. Sensory information detected by a user is referred to as "sensory input" with respect to the user.

A device included in and/or otherwise providing an execution environment may operate in a networked environment communicating with one or more devices via one or more network interface components. The terms "communication interface component" and "network interface component" are used interchangeably herein. FIG. 1 illustrates network interface adapter (NIA) 114 as a network interface component included in execution environment 102 to operatively couple device 100 to a network. A network interface component includes a network interface hardware (NIH) component and optionally a software component.

Exemplary network interface components include network interface controller components, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., a cellular, PCS, CDMA, and/or GSM network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

The terms "network node" and "node" in this document both refer to a device having a network interface component for operatively coupling the device to a network. Further, the terms "device" and "node" used herein refer to one or more devices and nodes, respectively, providing and/or otherwise included in an execution environment unless clearly indicated otherwise.

The user-detectable outputs of a user interface are generically referred to herein as "user interface elements". More specifically, visual outputs of a user interface are referred to herein as "visual interface elements". A visual interface element may be a visual output of a graphical user interface (GUI). Exemplary visual interface elements include windows, textboxes, sliders, list boxes, drop-down lists, spinners, various types of menus, toolbars, ribbons, combo boxes, tree views, grid views, navigation tabs, scrollbars, labels, tooltips, text in various fonts, balloons, dialog boxes, and various types of button controls including check boxes and radio buttons. An application interface may include one or more of the elements listed. Those skilled in the art will understand that this list is not exhaustive. The terms "visual representation", "visual output", and "visual interface element" are used interchangeably in this document. Other types of user interface elements include audio outputs referred to as "audio interface elements", tactile outputs referred to as "tactile interface elements", and the like.

A visual output may be presented in a two-dimensional presentation where a location may be defined in a two-dimensional space having a vertical dimension and a horizontal dimension. A location in a horizontal dimension may be referenced according to an X-axis and a location in a vertical dimension may be referenced according to a Y-axis. In another aspect, a visual output may be presented in a three-dimensional presentation where a location may be defined in a three-dimensional space having a depth dimension in addition to a vertical dimension and a horizontal dimension. A location in a depth dimension may be identified according to a Z-axis. A visual output in a two-dimensional presentation may be presented as if a depth dimension existed allowing the visual output to overlie and/or underlie some or all of another visual output.

An order of visual outputs in a depth dimension is herein referred to as a "Z-order". The term "Z-value" as used herein refers to a location in a Z-order. A Z-order specifies the front-to-back ordering of visual outputs in a presentation space. A visual output with a higher Z-value than another visual output may be defined to be on top of or closer to the front than the other visual output, in one aspect.

A "user interface (UI) element handler" component, as the term is used in this document, includes a component configured to send information representing a program entity for presenting a user-detectable representation of the program entity by an output device, such as a display. A "program entity" is an object included in and/or otherwise processed by an application or executable. The user-detectable representation is presented based on the sent information. Information that represents a program entity for presenting a user detectable representation of the program entity by an output device is referred to herein as "presentation information". Presentation information may include and/or may otherwise identify data in one or more formats. Exemplary formats include image formats such as JPEG, video formats such as MP4, markup language data such as hypertext markup language (HTML) and other XML-based markup, a bit map, and/or instructions such as those defined by various script languages, byte code, and/or machine code. For example, a web page received by a browser from a remote application provider may include HTML, ECMAScript, and/or byte code for presenting one or more user interface elements included in a user interface of the remote application. Components configured to send information representing one or more program entities for presenting particular types of output by particular types of output devices include visual interface element handler components, audio interface element handler components, tactile interface element handler components, and the like.

A representation of a program entity may be stored and/or otherwise maintained in a presentation space. As used in this document, the term "presentation space" refers to a storage region allocated and/or otherwise provided for storing presentation information, which may include audio, visual, tactile, and/or other sensory data for presentation by and/or on an output device. For example, a buffer for storing an image and/or text string may be a presentation space. A presentation space may be physically and/or logically contiguous or non-contiguous. A presentation space may have a virtual as well as a physical representation. A presentation space may include a storage location in a processor memory, secondary storage, a memory of an output adapter device, and/or a storage medium of an output device. A screen of a display, for example, is a presentation space.

As used herein, the term "program" or "executable" refers to any data representation that may be translated into a set of machine code instructions and optionally associated program data. Thus, a program or executable may include an application, a shared or non-shared library, and/or a system command. Program representations other than machine code include object code, byte code, and source code. Object code includes a set of instructions and/or data elements that either are prepared for linking prior to loading or are loaded into an execution environment. When in an execution environment, object code may include references resolved by a linker and/or may include one or more unresolved references. The context in which this term is used will make clear that state of the object code when it is relevant. This definition can include machine code and virtual machine code, such as Java™ byte code.

As used herein, an "addressable entity" is a portion of a program, specifiable in programming language in source code. An addressable entity is addressable in a program component translated for a compatible execution environment from the source code. Examples of addressable entities include variables, constants, functions, subroutines, procedures, modules, methods, classes, objects, code blocks, and labeled instructions. A code block includes one or more instructions in a given scope specified in a programming language. An addressable entity may include a value. In some places in this document "addressable entity" refers to a value of an addressable entity. In these cases, the context will clearly indicate that the value is being referenced.

Addressable entities may be written in and/or translated to a number of different programming languages and/or representation languages, respectively. An addressable entity may be specified in and/or translated into source code, object code, machine code, byte code, and/or any intermediate languages for processing by an interpreter, compiler, linker, loader, and/or other analogous tool.

Figure 2:
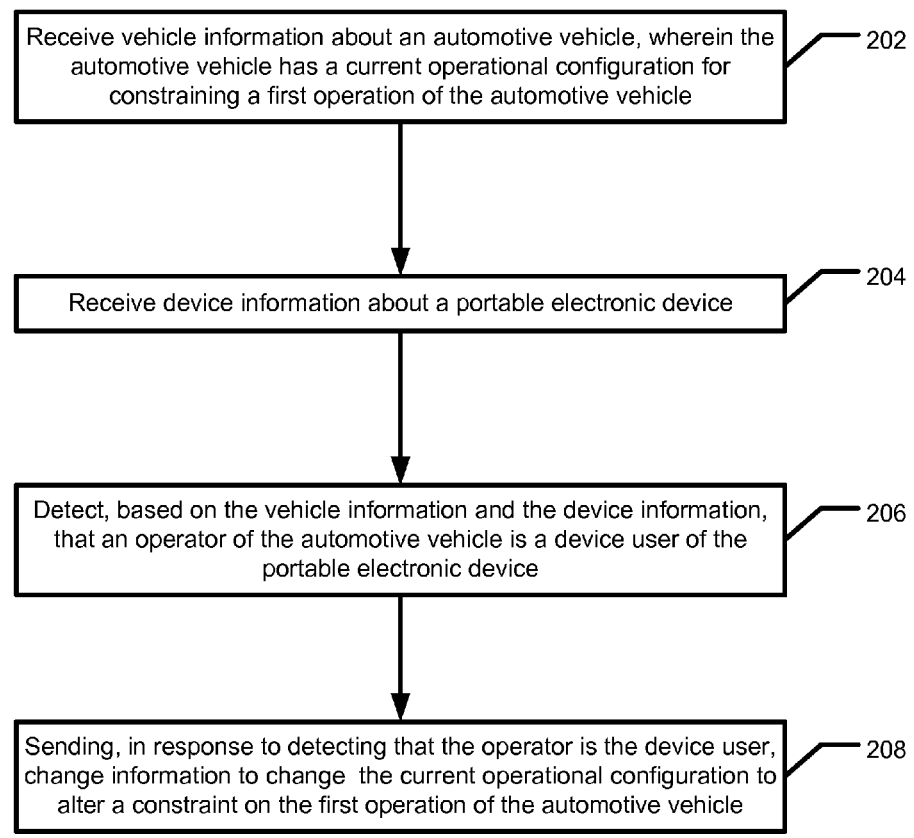
FIG. 2 is a flow diagram illustrating a method for managing operation of an automotive vehicle according to an aspect of the subject matter described herein.
Figure 3:
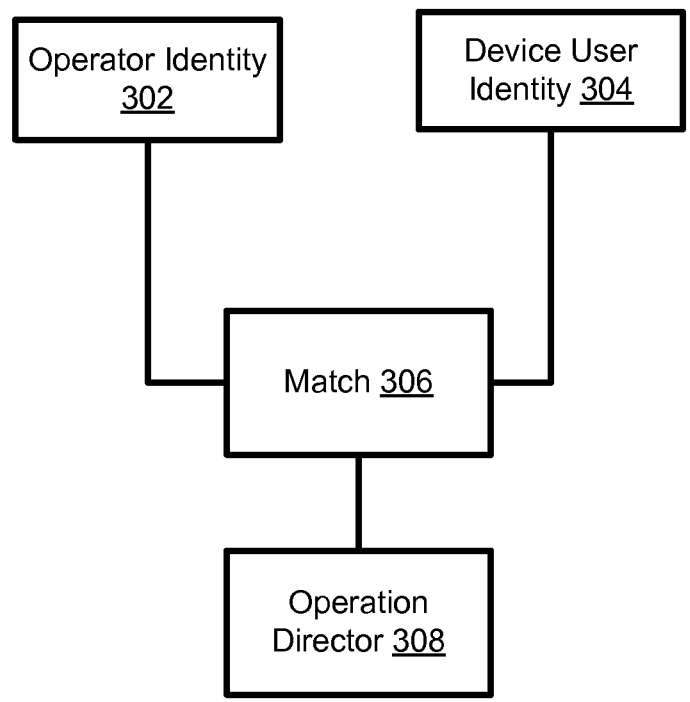
FIG. 3 is a block diagram illustrating an arrangement of components for managing operation of an automotive vehicle according to another aspect of the subject matter described herein.

The block diagram in FIG. 3 illustrates an exemplary system for managing operation of an automotive vehicle according to the method illustrated in FIG. 2. FIG. 3 illustrates a system, adapted for operation in an execution environment, such as execution environment 102 in FIG. 1, for performing the method illustrated in FIG. 2. The system illustrated includes an operator identity component 302, a user identity component 304, a match component 306, and an operation director component 308. The execution environment includes an instruction-processing unit, such as IPU 104, for processing an instruction in at least one of the operator identity component 302, the user identity component 304, the match component 306, and the operation director component 308.

Figure 4A:
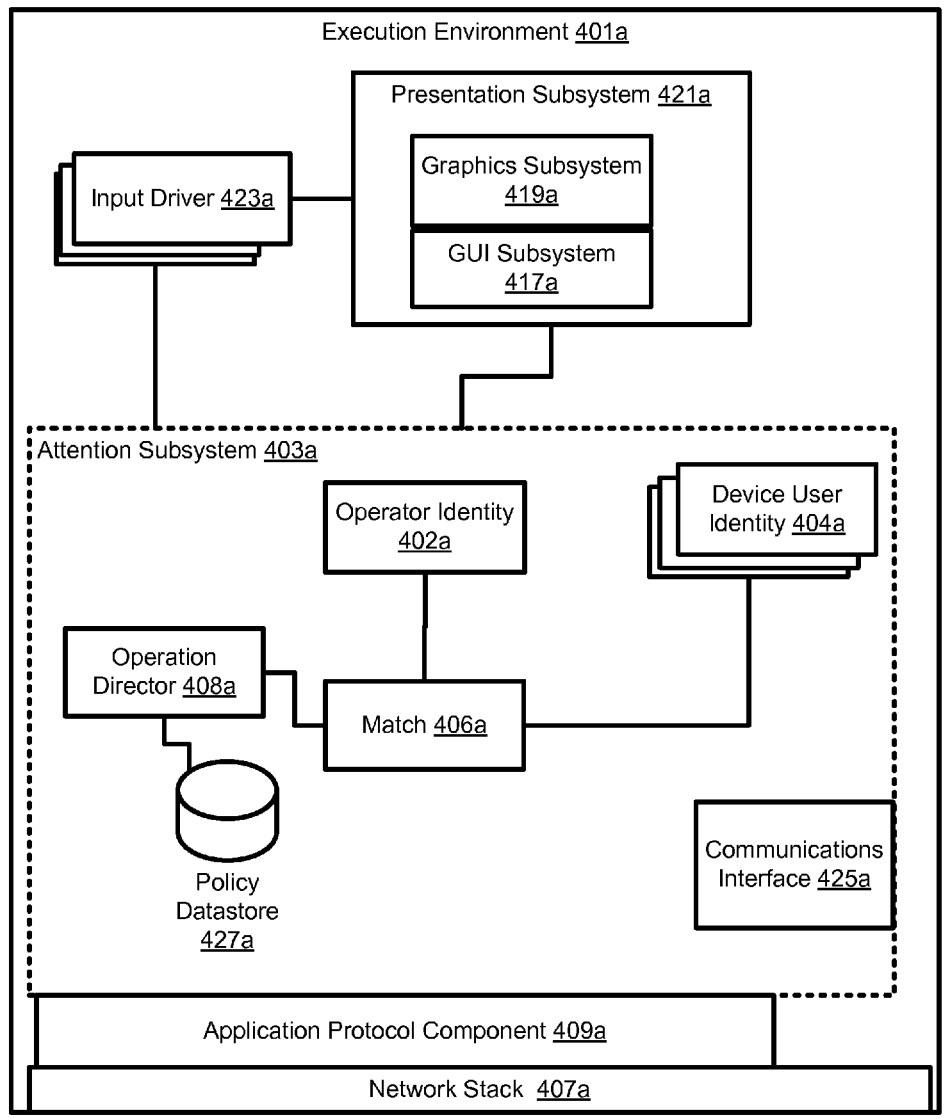
FIG. 4a is a block diagram illustrating an arrangement of components for managing operation of an automotive vehicle according to another aspect of the subject matter described herein.
Figure 4B:
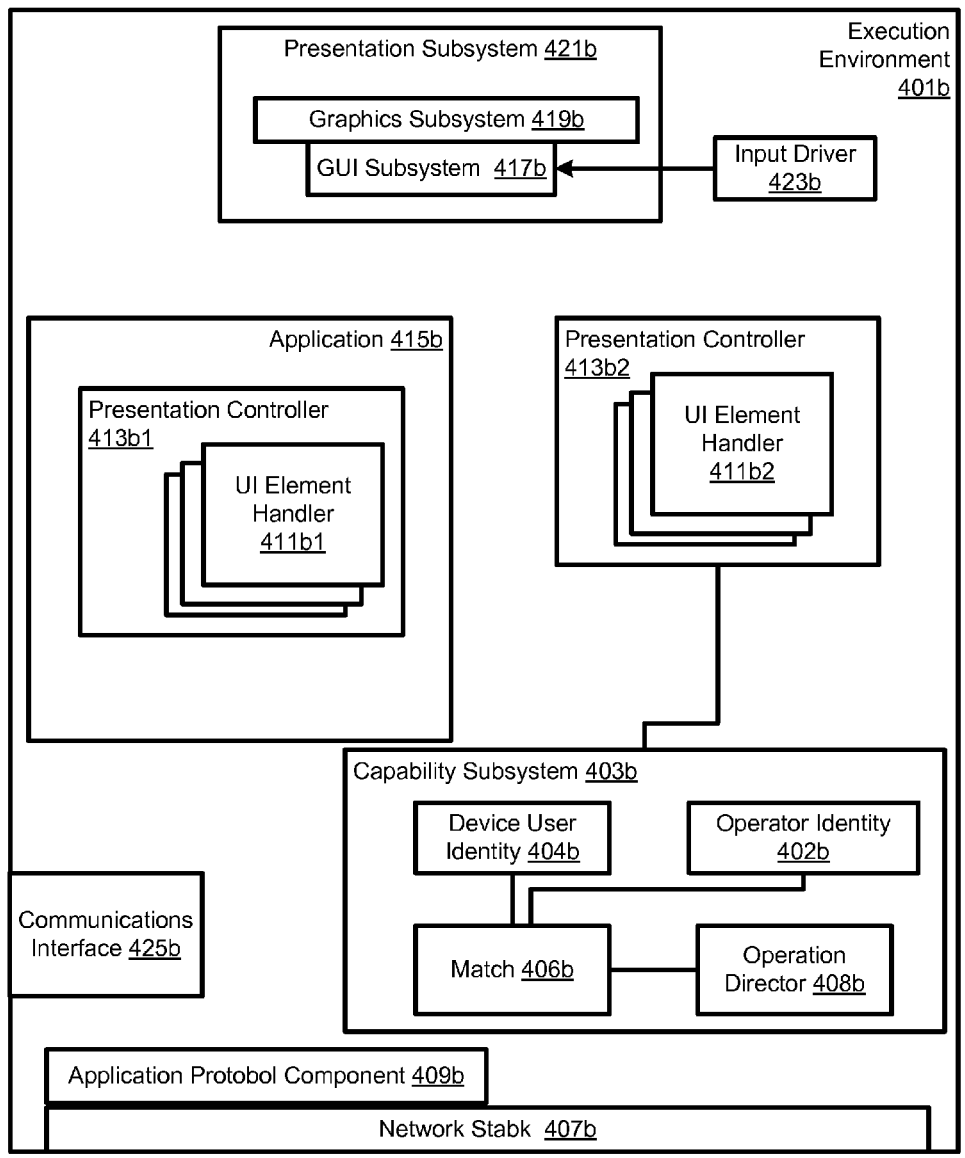
FIG. 4b is a block diagram illustrating an arrangement of components for managing operation of an automotive vehicle according to another aspect of the subject matter described herein.
Figure 4C:
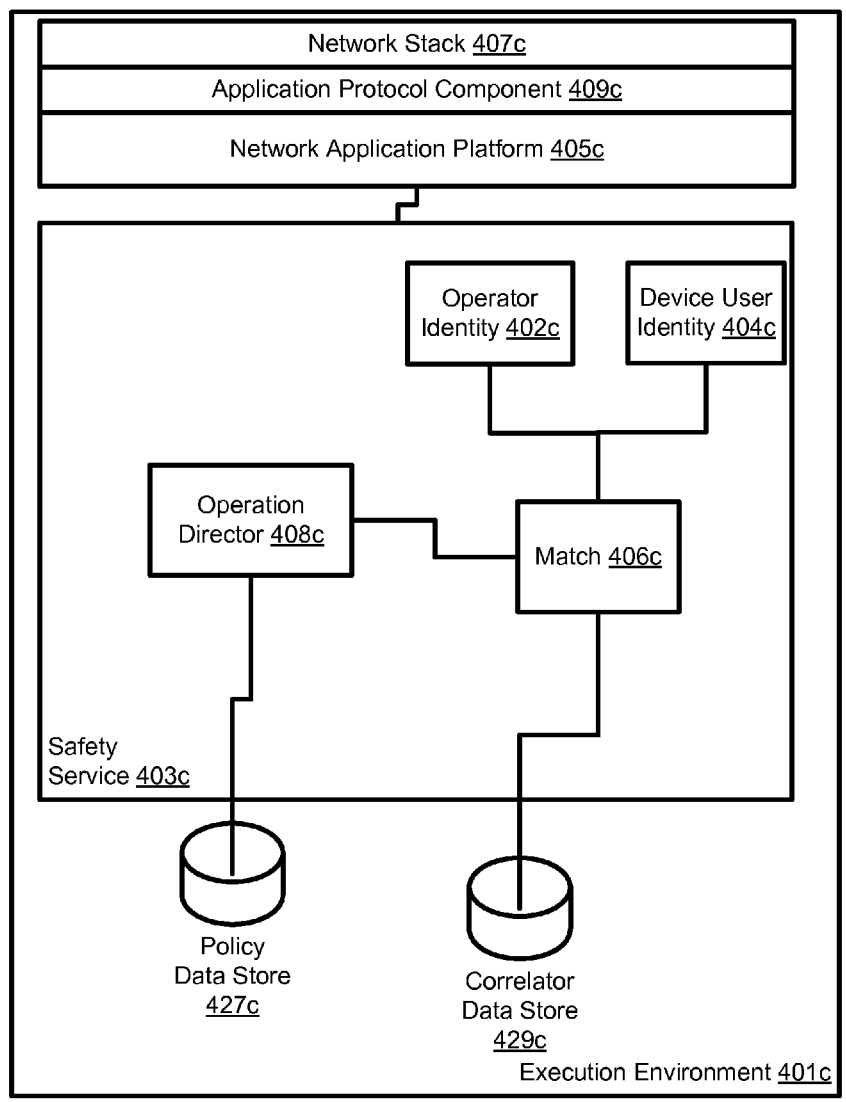
FIG. 4c is a block diagram illustrating an arrangement of components for managing operation of an automotive vehicle according to another aspect of the subject matter described herein.

Some or all of the exemplary components illustrated in FIG. 3 may be adapted for performing the method illustrated in FIG. 2 in a number of execution environments. FIGS. 4a-c are each block diagrams illustrating the components of FIG. 3 and/or analogs of the components of FIG. 3 respectively adapted for operation in execution environment 401a, execution environment 401b, and execution environment 401c that include or that otherwise are provided by one or more nodes. Components, illustrated in FIG. 4a, FIG. 4b, and FIG. 4c, are identified by numbers with an alphabetic character postfix. Execution environments; such as execution environment 401a, execution environment 401b, execution environment 401c, and their adaptations and analogs; are referred to herein generically as execution environment 401 or execution environments 401 when describing more than one. Other components identified with an alphabetic postfix may be referred to generically or as a group in a similar manner.

FIG. 1 illustrates key components of an exemplary device that may at least partially provide and/or otherwise be included in an execution environment. The components illustrated in FIG. 4a, FIG. 4b, and FIG. 4c may be included in or otherwise combined with the components of FIG. 1 to create a variety of arrangements of components according to the subject matter described herein.

Figure 5:
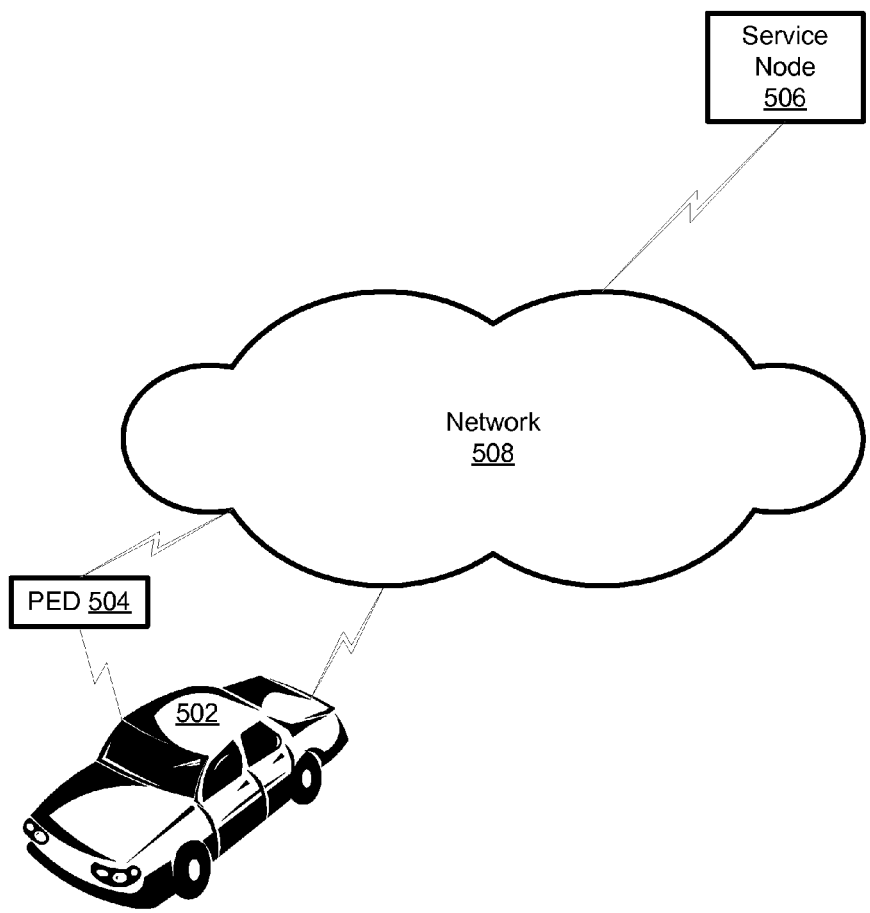
FIG. 5 is a network diagram illustrating an exemplary system for managing operation of an automotive vehicle according to another aspect of the subject matter described herein.

FIG. 4a illustrates execution environment 401a including an adaptation of the arrangement of components in FIG. 3. In an aspect, execution environment 401a may be included in automotive vehicle 502 illustrated in FIG. 5. FIG. 4b illustrates execution environment 401b including an adaptation of the arrangement in FIG. 3. In an aspect, execution environment 401b may be included in portable electronic device (PED) 504 illustrated in FIG. 5. As used herein, the term "portable electronic device" refers to a portable device including an IPU and configured to provide a user interface for interacting with a user. Exemplary portable electronic devices include mobile phones, tablet computing devices, personal media players, and media capture devices, to name a few examples. FIG. 5 illustrates PED 504 external to automotive vehicle 502 for ease of illustration. In many, if not most cases, a portable electronic device will be in an automotive vehicle, such as in a storage compartment, on a seat, held by an occupant of the automotive vehicle, in clothing of an occupant, and/or worn by an occupant. FIG. 4c illustrates execution environment 401c configured to host a network accessible application illustrated by safety service 403c. Safety service 403c includes another adaptation or analog of the arrangement of components in FIG. 3. In an aspect, execution environment 401c may include and/or otherwise be provided by service node 506 illustrated in FIG. 5.

Adaptations and/or analogs of the components illustrated in FIG. 3 may be installed persistently in an execution environment while other adaptations and analogs may be retrieved and/or otherwise received as needed via a network. In an aspect, some or all of the arrangement of components operating in automotive vehicle 502 and/or in PED 504 may be received via network 508. For example, service node 506 may provide some or all of the components. Various adaptations of the arrangement in FIG. 3 may operate at least partially in execution environment 401a, at least partially in execution environment 401b, and/or at least partially in execution environment 401c. An arrangement of components for performing the method illustrated in FIG. 2 may operate in a single execution environment, in one aspect, and may be distributed across more than one execution environment, in another aspect.

As stated the various adaptations of the arrangement in FIG. 3 are not exhaustive. For example, those skilled in the art will see based on the description herein that arrangements of components for performing the method illustrated in FIG. 2 may be adapted to operate in an automotive vehicle, in a portable electronic device, in a node other than the automotive vehicle and other than the portable electronic device, and may be distributed across more than one node in a network and/or more than one execution environment.

As described above, FIG. 5 illustrates automotive vehicle 502. An automotive vehicle may include a gas powered, oil powered, bio-fuel powered, solar powered, hydrogen powered, and/or electricity powered car, truck, van, bus, and the like. In an aspect, automotive vehicle 502 may communicate with one or more application providers via a network, illustrated by network 508 in FIG. 5. Service node 506 illustrates one such application provider. Automotive vehicle 502 may communicate with network application platform 405c in FIG. 4c operating in execution environment 401c included in and/or otherwise provided by service node 506. Automotive vehicle 502 and service node 506 may each include a network interface component operatively coupling each respective node to network 508.

In another aspect, PED 504 may communicate with one or more application providers. PED 504 may communicate with the same and/or different application provider as automotive vehicle 502. For example, PED 504 may communicate with network application platform 405c in FIG. 4c operating in service node 506. PED 504 and service node 506 may each include a network interface component operatively coupling each respective node to network 508.

In still another aspect, PED 504 may communicate with automotive vehicle 502. PED 504 and automotive vehicle 502 may communicate via network 508. Alternatively or additionally, PED 504 and automotive vehicle may 502 may communicate via a communications interface operatively coupled to a physical link between PED 504 and automotive vehicle 502. For example, PED 504 may operate as a peripheral device with respect to automotive vehicle 502 and/or vice versa. The communication couplings described between and among automotive vehicle 502, PED 504, and service node 506 are exemplary and, thus, not exhaustive.

FIGS. 4a-c illustrate network stacks 407 configured for sending and receiving data over a network such as the Internet. Network application platform 405c in FIG. 4c may provide one or more services to safety service 403c. For example, network application platform 405c may include and/or otherwise provide web server functionally on behalf of safety service 403c. FIG. 4c also illustrates network application platform 405c configured for interoperating with network stack 407c providing network services for safety service 403c. Network stack 407a in FIG. 4a and network stack 407b in FIG. 4b serve roles analogous to network stack 407c.

Network stacks 407, in FIGS. 4a-c, may support the same protocol suite, such as TCP/IP, or may enable their respective hosting nodes to communicate via a network gateway (not shown) or other protocol translation device(s) (not shown) and/or service(s) (not shown). For example, automotive vehicle 502 and service node 506 in FIG. 5 may interoperate via their respective network stacks: network stack 407a in FIG. 4a and network stack 407c in FIG. 4c.

FIG. 4a illustrates attention subsystem 403a; FIG. 4b illustrates capability subsystem; and FIG. 4c illustrates safety service 403c. FIGS. 4a-c illustrate application protocol components 409 exemplifying components configured to communicate according to one or more application protocols. Exemplary application protocols include a hypertext transfer protocol (HTTP), a remote procedure call (RPC) protocol, an instant messaging protocol, and/or a presence protocol. Application protocol components 409 in FIGS. 4a-c may support compatible application protocols. Matching protocols enable, for example, attention subsystem 403a supported by automotive vehicle 502 to communicate with safety service 403c of service node 506 via network 508 in FIG. 5. Matching protocols are not required if communication is via a protocol gateway or other protocol translator.

In FIG. 4a, attention subsystem 403a may receive some or all of the arrangement of components in FIG. 4a in one more messages received via network 508 from another node. In an aspect, the one or more messages may be sent by safety service 403c via network application platform 405c, network stack 407c, a network interface component, and/or application protocol component 409c in execution environment 401c. Attention subsystem 403a may interoperate with application protocol component 409a, providing one or more of the application protocols, and/or network stack 407a to receive the message or messages including some or all of the components and/or their analogs adapted for operation in execution environment 401a.

In FIG. 4b, capability subsystem 403b may receive some or all of the arrangement of components in FIG. 4b in one more messages received via network 508 from another node. In an aspect the one or more messages may be sent by safety service 403c via network application platform 405c, network stack 407c, a network interface component, and/or application protocol component 409c in execution environment 401c. Capability subsystem 403b may interoperate via one or more of the application protocols supported by application protocol component 409b and/or with network stack 407b to receive the message or messages including some or all of the components and/or their analogs adapted for operation in execution environment 401b UI element handler components 411b are illustrated in respective presentation controller components 413b in FIG. 4b. UI element handler components 411 and presentation controller components 413 are not shown in FIG. 4a and in FIG. 4c, but those skilled in the art will understand upon reading the description herein that adaptations and/or analogs of these components configured to perform analogous operations may be adapted for operating in execution environment 401a as well as execution environment 401c. A presentation controller component 413 may manage the visual, audio, and/or other types of output of an application or executable. FIG. 4b illustrates presentation controller component 413b1 including one or more UI element handler components 411b1 for managing one or more types of output for application 415b. A presentation controller component and/or a UI element handler component may be configured to receive and route detected user and other inputs to components and extensions of its including application or executable.

With respect to FIG. 4b, a UI element handler component 411b in various aspects may be adapted to operate at least partially in a content handler component (not shown) such as a text/html content handler component and/or a script content handler component. One or more content handlers may operate in an application such as a web browser. Additionally or alternatively, a UI element handler component 411 in an execution environment 401 may operate in and/or as an extension of its including application or executable. For example, a plug-in may provide a virtual machine, for a UI element handler component received as a script and/or byte code. The extension may operate in a thread and/or process of an application and/or may operate external to and interoperating with an application.

FIG. 4b illustrates application 415b operating in execution environment 401b included in PED 504. Various UI elements of application 415b may be presented by one or more UI element handler components 411b1 in FIG. 4b. Applications and/or other types of executable components operating in execution environment 401a and/or execution environment 403c may also include UI element handler components and/or otherwise interoperate with UI element handler components for presenting user interface elements via one or more output devices, in some aspects. FIG. 4b illustrates capability subsystem 403b operatively coupled to presentation controller component 413b2 and UI element handler components 411b2 for presenting output via one or more output devices of execution environment 401b.

GUI subsystems 417 illustrated respectively in FIG. 4a and in FIG. 4b may instruct a corresponding graphics subsystem 419 to draw a UI interface element in a region of a display presentation space, based on presentation information received from a corresponding UI element handler component 411. A graphics subsystem 419 and a GUI subsystem 417 may be included in a presentation subsystem 421 which may include one or more output devices and/or may otherwise be operatively coupled to one or more output devices.

In some aspects, input may be received and/or otherwise detected via one or more input drivers illustrated by input drivers 423 in FIGS. 4a-b. An input may correspond to a UI element presented via an output device. For example, a user may manipulate a pointing device, such as a touch screen, to a pointer presented in a display presentation space over a user interface element, representing a selectable operation. A user may provide an input detected by an input driver 423. The detected input may be received by a GUI subsystem 417 via the input driver 423 as an operation or command indicator based on the association of the shared location of the pointer and the operation user interface element. FIG. 4a illustrates that an input driver 432a may receive information for a detected input and may provide information based on the input without presentation subsystem 421a operating as an intermediary. FIG. 4a illustrates, that in an aspect, one or more components in attention subsystem 403a may receive input information in response to an input detected by an input driver 423a.

An "interaction", as the term is used herein, refers to any activity including a user and an object where the object is a source of sensory input detected by the user. In an interaction the user directs attention to the object. An interaction may also include the object as a target of input from the user. The input may be provided intentionally or unintentionally by the user. For example, a rock being held in the hand of a user is a target of input, both tactile and energy input, from the user. A portable electronic device is a type of object. In another example, a user looking at a portable electronic device is receiving sensory input from the portable electronic device whether the device is presenting an output via an output device or not. The user manipulating an input component of the portable electronic device exemplifies the device, as an input target, receiving input from the user. Note that the user in providing input is detecting sensory information from the portable electronic device provided that the user directs sufficient attention to be aware of the sensory information and provided that no disabilities prevent the user from processing the sensory information. An interaction may include an input from the user that is detected and/or otherwise sensed by the device. An interaction may include sensory information that is detected by a user included in the interaction and presented by an output device included in the interaction.

As used herein "interaction information" refers to any information that identifies an interaction and/or otherwise provides data about an interaction between the user and an object, such as a portable electronic device. Exemplary interaction information may identify a user input for the object, a user-detectable output presented by an output device of the object, a user-detectable attribute of the object, an operation performed by the object in response to a user, an operation performed by the object to present and/or otherwise produce a user-detectable output, and/or a measure of interaction.

Interaction information for one object may include and/or otherwise identify interaction information for another object. For example, a motion detector may detect an operator's head turn in the direction of a windshield of an automotive vehicle. Interaction information identifying the operator's head is facing the windshield may be received and/or used as interaction information for the windshield indicating the operator's is receiving visual input from a viewport provided by some or all of the windshield. The interaction information may serve to indicate a lack of operator interaction with one or more other viewports such as a rear window of the automotive vehicle. Thus the interaction information may serve as interaction information for one or more viewports.

The term "occupant" as used herein refers to a passenger of an automotive vehicle. An operator of an automotive vehicle is an occupant of the automotive vehicle. As the terms are used herein, an "operator" of an automotive vehicle and a "driver" of an automotive vehicle are equivalent.

The term "vehicle information", as used herein, refers to information about an automotive vehicle that is included in determining whether an operator of the automotive vehicle is also a user of a portable electronic device. Analogously, the term "device information", as used herein, refers to information about a portable electronic device included in determining whether an operator of an automotive vehicle is also a user of the portable electronic device. For example, vehicle information may include and/or otherwise identify information about the operator of an automotive vehicle, such as an operator identifier for matching with a user identifier identified by user information identified and/or otherwise included in device information for a portable electronic device.

Vehicle information may also include and/or otherwise may also identify any information about the automotive vehicle for determining whether the automotive vehicle is operating. Analogously, device information may also include and/or otherwise may also identify any information about the portable electronic device for detecting an interaction between the device user and the portable electronic device. For example, vehicle information for an automotive vehicle may include and/or otherwise identify a speed, a rate of acceleration, a thermal property of an operational component, a change in distance to an entity external to the vehicle, an input of the operator detected by the automotive vehicle, and the like. Exemplary device information may identify a detected user input, a user detectable output, an operation performed in response to a user input, and/or an operation perform to present a user detectable output. The term "device user", as used herein, refers to a user of a device. The term "operational component", as used herein, refers to a component of a device included in the operation of a device. A viewport is one type of operational component of an automotive vehicle.

The term "viewport" as used herein refers to any opening and/or surface of an automotive vehicle that provides a view of a space outside the automotive vehicle. A window, a screen of a display device, a projection from a projection device, and a mirror are all viewports and/or otherwise included in a viewport. A view provided by a viewport may include an object external to the automotive vehicle visible to the operator and/other occupant. The external object may be an external portion of the automotive vehicle or may be an object that is not part of the automotive vehicle.

The term "operational information" as used herein refers to any information accessible to a device for processing by the device that affects the operation of the device where the data can be changed by a user of the device and/or by another device. Thus, operational information includes configuration setting, data accessible via a communications interface of the device, data accessible via a data storage medium of the data storage medium. Data may include an executable instruction. Operational information may include an application, a code library, a script, a plug-in, and/or any other type of executable. Operational information constrains a device by specifying data that may or may not be processed and/or instructions that may or may not be executed. For example, data that sets a speed limit for an automotive vehicle constrains the movement of the automotive vehicle to movement at or below a particular velocity or within a range of velocities. A cruise control subsystem of an automotive vehicle may be provided with operational information that constrains the speed of the automotive vehicle that includes the cruise control subsystem.

With reference to FIG. 2, block 202 illustrates that the method includes receiving vehicle information about an automotive vehicle, wherein the automotive vehicle has a current operational configuration for constraining a first operation of the automotive vehicle. Accordingly, a system for managing operation of an automotive vehicle includes means for receiving vehicle information about an automotive vehicle, wherein the automotive vehicle has a current operational configuration for constraining a first operation of the automotive vehicle. For example, as illustrated in FIG. 3, operator identity component 302 is configured for receiving vehicle information about an automotive vehicle, wherein the automotive vehicle has a current operational configuration for constraining a first operation of the automotive vehicle. FIGS. 4a-c illustrate operator identity components 402 as adaptations and/or analogs of operator identity component 302 in FIG. 3. One or more operator identity components 402 operate in an execution environment 401.

In FIG. 4a, operator identity component 402a is illustrated as a component of attention subsystem 403a. In FIG. 4b, operator identity component 402b is illustrated as a component of capability subsystem 403b. In FIG. 4c, operator identity component 402b is illustrated as a component of safety service 403c. An operator identity component 402 may be adapted to receive vehicle information in any suitable manner, in various aspects. For example receiving vehicle information may include receiving a message via network, receiving data via a communications interface, detecting a user input, sending a message via a network, receiving data in response to data sent via a communications interface, receiving data via user interaction with a presented a user interface element, interoperating with an invocation mechanism, interoperating with an interprocess communication (IPC) mechanism, accessing a register of a hardware component, receiving data in response to generating a hardware interrupt, responding to a hardware interrupt, receiving data in response to generating a software interrupt, and/or responding to a software interrupt.

Exemplary invocation mechanisms include a function call, a method call, and a subroutine call. An invocation mechanism may pass data to and/or from an operator identity component via a stack frame and/or via a register of an IPU. Exemplary IPC mechanisms include a pipe, a semaphore, a signal, a shared data area, a hardware interrupt, and a software interrupt.

In an aspect, operator identity component 402a, illustrated in FIG. 4a, may receive vehicle information via an invocation in response to an operator input detected by an input driver component 423a interoperating with an input device adapter, as described with respect to FIG. 1. For example, a particular key may be detected when inserted into an ignition switch in automotive vehicle 502. The particular key may be associated with a particular operator by operator identity component 402a. Operator identifiers, in an aspect, may be stored in persistent storage accessible within and/or via execution environment 401a. Operator identity component 402a may retrieve the operator identifier based on information detected in response to the insertion of the particular key in the ignition switch. The key may include a data store including information for matching the operator with a user of PED 504.

In another aspect, illustrated in FIG. 4b, operator identity component 402b may receive vehicle information in a message received via network stack 407b and optionally via application protocol component 409b. In still another aspect, PED 504 may request vehicle information via a network such as a local area network including automotive vehicle 502 and PED 504. PED 504 may listen for a heartbeat message on the LAN indicating automotive vehicle 502 is included as a node in the LAN. Capability subsystem 403b may interoperate with a network interface adapter and/or network stack 407b to activate listening for the heartbeat message. In response to detecting the heartbeat message, capability subsystem 403b may invoke operator identity component 402b to send a request to automotive vehicle 502 based on information in the heartbeat message. Vehicle information may be included in and/or otherwise identified in a response received by operator identity component 402b. Alternatively or additionally, an asynchronous message, such as a heartbeat message, may include vehicle information.

Alternatively or additionally, operator identity component 402b may receive vehicle information via communications interface 425b communicatively linking PED 504 with automotive vehicle 502. For example, PED 504 may be operatively coupled to automotive vehicle 502 via a universal serial bus (USB) component (not shown) included in and/or otherwise coupled to communications interface component 425b. Communications interface component 425b in PED 504, in an aspect, may detect a link to automotive vehicle 502 based on a USB profile active in the operative coupling. Vehicle information may be sent to PED 504 for receiving by operator identity component 402b with and/or without a request sent from PED 504, according to the configuration of the particular arrangement of components.

Receiving vehicle information may include receiving the vehicle information via a physical communications link, a wireless network, a local area network (LAN), a wide area network (WAN), and/or an internet. Vehicle information may be received via any suitable communications protocol, in various aspects. Exemplary protocols include a universal serial bus (USB) protocol, a BLUETOOTH protocol, a TCP/IP protocol, hypertext transfer protocol (HTTP), a remote procedure call (RPC) protocol, a protocol supported by a serial link, a protocol supported by a parallel link, and Ethernet. Receiving vehicle information may include receiving a response to a request previously sent via a communications interface. Receiving vehicle information may include receiving the vehicle information in data transmitted asynchronously. An asynchronous message is not a response to any particular request and may be received without any associated previously transmitted request.

In yet another aspect, illustrated in FIG. 4c, network application platform component 405c may receive vehicle information in a message transmitted via network 508. The message may be routed within execution environment 401c to operator identity component 402c by network application platform 405c. For example, the message may include a universal resource identifier (URI) that network application platform 405c is configured to associate with operator identity component 402c. In another aspect, in response to an ignition event and/or an input from an operator of automotive vehicle 502, automotive vehicle 502 may send vehicle information to service node 506 via network 508. Safety service 403c may be configured to monitor one or more automotive vehicles including automotive vehicle 502. A component of safety service 403c, such as operator identity component 402c, may periodically send a message via network 508 to automotive vehicle 502 requesting vehicle information. If automotive vehicle has an operator and/or is operatively coupled to network 508, automotive vehicle 502 may respond to the request by sending a message including vehicle information. The message may be received and the vehicle information may be provided to operator identity component 402c as described above and/or in an analogous manner.

Block 204, in FIG. 2, illustrates that the method further includes receiving device information about a portable electronic device. Accordingly, a system for managing operation of an automotive vehicle includes means for receiving device information about a portable electronic device. For example, as illustrated in FIG. 3, user identity component 304 is configured for receiving device information about a portable electronic device. FIGS. 4a-c illustrate user identity components 404 as adaptations and/or analogs of user identity component 304 in FIG. 3. One or more user identity components 404 operate in execution environments 401.

In FIG. 4a, user identity component 404a is illustrated as a component of attention subsystem 403a. In FIG. 4b, user identity component 404b is illustrated as a component of capability subsystem 403b. In FIG. 4c, user identity component 404c is illustrated as component of safety service 403c. A device user identify component 404 may be adapted to receive device information in any suitable manner, in various aspects. For example receiving device information may include receiving a message via network, receiving data via a communications interface, detecting a user input, sending a message via a network, sending data via a communications interface, presenting a user interface element for interacting with a user, interoperating with an invocation mechanism, interoperating with an interprocess communication (IPC) mechanism, accessing a register of a hardware component, generating a hardware interrupt, responding to a hardware interrupt, generating a software interrupt, and/or responding to a software interrupt.

In an aspect, device user identity component 404b, illustrated in FIG. 4b, may receive device information via a hardware interrupt in response to insertion of a smart card in a smart card reader in and/or operatively attached to PED 504. In another aspect, input driver(s) 423b may detect user input from a button or sequence of buttons in PED 504. The button or buttons may receive input for a user ID and/or password for PED 504, an application accessible in and/or otherwise via PED 504, and/or a hardware component in and/or accessible via PED 504. The user ID may be associated with a particular user of PED 504 by device user identity component 404b which may include and/or otherwise may be configured to operate with an authentication component (not shown). The authentication component may operate, at least in part, in a remote node, such as service node 506. User ID and/or password information may be stored in persistent storage accessible within and/or via execution environment 401b. For example, user ID and password information may be stored in a data storage device of service node 506.

In another aspect, device user identity component 404a, illustrated in FIG. 4a, may receive device information in a message received via network stack 407a and optionally via application protocol component 409a. Automotive vehicle 502 may receive the message asynchronously or in response to a request to PED 504. Attention subsystem 403a may interoperate with a network interface adapter and/or network stack 407a to receive the message. In response to receiving the message, attention subsystem 403a may send the device information via a message queue to be received by device user identity component 404a configured to monitor the message queue.

Alternatively or additionally, device user identity component 404a may receive device information via communications interface 425a communicatively linking PED 504 with automotive vehicle 502. In an aspect, PED 504 may be operatively coupled to a serial port included in and/or otherwise coupled to communications interface component 425a. The serial port in automotive vehicle 502 may detect a link to PED 504 based on a signal received from PED 504 via the serial link. Device information may be sent to automotive vehicle 502 for receiving by device user identity component 404a in response to a request from automotive vehicle 502.

Receiving device information may include receiving the device information via a physical communications link, a wireless network, a local area network (LAN), a wide area network (WAN), and an internet. Device information may be received via any suitable communications protocol, in various aspects. Exemplary protocols includes a universal serial bus (USB) protocol, a BLUETOOTH protocol, a TCP/IP protocol, hypertext transfer protocol (HTTP), a remote procedure call (RPC) protocol, a serial protocol, Ethernet, and/or a parallel port protocol. Receiving device information may include receiving a response to a request previously sent via communications interface. Receiving device information may include receiving the device information in data transmitted asynchronously.

In yet another aspect, network application platform component 405c, illustrated in FIG. 4c, may receive device information in a message transmitted via network 508. The message and/or message content may be routed within execution environment 401c to device user identity component 404c for receiving device information in and/or otherwise identified by the message sent from PED 504. The device information may be provided to device user identity component 404c by network application platform 405c. For example, the message may be received via a Web or cloud application protocol interface (API) transported according to HTTP. The message may identify a particular service provided, at least in part, by device user identity component 404c. In still another aspect, a message identifying device user information may be received by device user identity component 404c in service node 506, where the message is sent by automotive vehicle 502. Automotive vehicle 502 may receive the device information from PED 504 prior to automotive vehicle 502 sending the message to service node 506.

In an aspect, in response detecting an incoming communication identifying the device user of PED 504 as a communicant in the communication, PED 504 may send device information to service node 506 via network 508. The term "communicant" refers to a user participant in a communication, as used herein.

In another aspect, safety service 403c may be configured to monitor one or more portable electronic devices. A component of safety service 403c, such as device user identity component 404c may periodically send a message via network 508 to PED 504 requesting device information. PED 504 may respond to the request by sending a message including device information. The message may be received and the device information may be provided to device user identity component 404c as described above and/or in an analogous manner.

Returning to FIG. 2, block 206 illustrates that the method yet further includes detecting, based on the vehicle information and the device information, that an operator of the automotive vehicle is a device user of the portable electronic device. Accordingly, a system for managing operation of an automotive vehicle includes means for detecting, based on the vehicle information and the device information, that an operator of the automotive vehicle is a device user of the portable electronic device. For example, as illustrated in FIG. 3, match component 306 is configured for detecting, based on the vehicle information and the device information, that an operator of the automotive vehicle is a device user of the portable electronic device. FIGS. 4a-c illustrate match component 406b as adaptations and/or analogs of match component 306 in FIG. 3. One or more match components 406b operate in execution environments 401.

Detecting that a vehicle operator of an automotive vehicle is a device user of a portable electronic device may include comparing some or all of the information in and/or otherwise identified by device information for the portable electronic device with information in and/or otherwise identified by vehicle information for the automotive vehicle. In an aspect, detecting the operator of automotive vehicle 502 is the user of PED 504 may include a match component 406 in an execution environment 401 illustrated in FIGS. 4a-c, determining whether a direct match exists. For example, match component 406c operating in service node 506 may compare user IDs respectively identified in vehicle information received, directly and/or indirectly, from automotive vehicle 502 and in device information received, directly and/or indirectly, from PED 504.

In another aspect, a match may be determined indirectly. Detecting that an operator of an automotive vehicle is a user of a portable electronic device may include detecting a first association identifying device information and a correlator. The detecting may further include locating and/or otherwise identifying a second association identifying vehicle information and the correlator. The first association and the second association both identifying the same correlator may be defined as an indication that the operator is the user.

In FIG. 4c, match component 406c may be invoked to locate a record in correlator data store 429c. A search for the record may be initiated based on information identified in vehicle information received for automotive vehicle 502. Match component 406c may also locate a record in correlator data store 429c based on information identified in device information received for PED 504. Match component 406c may further determine that the correlator identified in the respective records is the same correlator and/or determine that the correlators are equivalents. Match component 406c may be configured to identify the operator of automotive vehicle 502 as the user of PED 504 when the device information and the vehicle information have the same matching correlators. While a correlator datastore is not illustrated in FIG. 4a or in FIG. 4b, the arrangements of components in FIG. 4a and/or in FIG. 4b may be adapted to operate in an analogous manner to that just described for the arrangement in FIG. 4c.

A correlator may be included in device information and/or associated with a device association via a record that identifies the correlator and some or all of the information identified by the device information. As with the device information, a correlator may be in vehicle information and/or otherwise identified by an association identifying the correlator and some or all of the information in the vehicle information.

In another aspect, a correlator may be generated from and/or otherwise based on device information and/or vehicle information. Rather than or in addition to looking up a stored correlator, a match component 406 in FIGS. 4a-c may be configured to generate a correlator from by, for example, calculating a value from one or more user communications addresses identified in one or more of the device information for PED 504 and the vehicle information for automotive vehicle 502.

In still another aspect, detecting that an operator of an automotive vehicle is a user of a portable electronic device may include determining that the automotive vehicle and the portable electronic device are communicatively coupled via a particular a communications interface, a particular network port, and/or a particular protocol. Detecting that the operator is the user may be based on one or more of the communications interface, the network port, and the protocol. For example, communications interface component 425b may be configured to communicate via a protocol defined for matching an operator of an automotive vehicle with a user of a portable electronic device. Match component 406b may interoperate with communications component 425b to detect when PED 504 successfully communicates with automotive vehicle 502 via the defined protocol. Match component 406b may be configured to identify the operator of automotive vehicle 502 as the user of PED 504 in response to detecting the successful communication. No personal information about the user and/or the operator need be communicated via the defined protocol. A successful communication via the particular protocol may be defined to be sufficient for a match component 406 to detect that the automotive vehicle 502 has an operator that is also a user of PED 504. The personal identity of the user and/or operator need not be revealed in the communication and may not be required in detecting that the operator is the user.

In another aspect, a match component 406 may operate to detect whether an operator of an automotive vehicle is also a user of a portable electronic device automatically in response to receiving device information and vehicle information. Alternatively, a match component 406 may be configured to perform the detecting operation in response to some other condition and/or event. For example, detecting whether an operator of an automotive vehicle is a user of a portable electronic device may be performed in response to detecting a request for a communication with another node where the user of the portable electronic device is identified as a communicant.

For example, detecting whether the user of PED 504 is the operator of automotive vehicle 502 may be performed in response to detecting an operation to process a voice communication, an email, a short message service (SMS) communication, a multi-media message service (MMS) communication, an instant message communication, and/or a video message communication, where the user of PED 504 is identified as a communicant in the detected communication(s). Execution environment 401b may include a communications client (not shown), such as a text messaging client, that represents the user, identified by a communications address, as a communicant in text messages sent by PED 504 and/or received by PED 504 on behalf of the user.

A communication may be detected in response to an input from the user of PED 504 to initiate a communication session, send data in a communication, and/or to receive data in a communication. A communication may also be detected in response to receiving a message in a communication from a node, via network 508, where the node includes a communications client that represents another communicant included in and/or otherwise represented in the communication.

Returning to FIG. 2, block 208 illustrates that the method yet further includes sending, in response to detecting that the vehicle operator is the device user, change information to change the current operational configuration to alter a constraint on the first operation of the automotive vehicle. Accordingly, a system for managing operation of an automotive vehicle includes means for sending, in response to detecting that the vehicle operator is the device user, change information to change the current operational configuration to alter a constraint on the first operation of the automotive vehicle. For example, as illustrated in FIG. 3, operation director component 308 is configured for sending, in response to detecting that the vehicle operator is the device user, change information to change the current operational configuration to alter a constraint on the first operation of the automotive vehicle. FIGS. 4a-c illustrate operation director component 408 as adaptations and/or analogs of operation director component 308 in FIG. 3. One or more operation director components 408 operate in execution environments 401.

In various aspects, adaptations and analogs of operation director component 308 may send change information via any suitable mechanism including an invocation mechanism, such as a function and/or method call utilizing a stack frame; an interprocess communication mechanism, such as a pipe, a semaphore, a shared data area, a hardware interrupt, a software interrupt; a register of a hardware component, such as an IPU register; a hardware bus, and/or a network message, such as an HTTP request and/or an asynchronous message. Sending change information may include sending data via a communication interface which may be a network interface, receiving data via a communication interface which may be a network interface, representing change information in presentation information sent to present to an operator of an automotive vehicle via a presentation device, detecting a user input, and/or detecting a request to perform an operation on behalf of the operator.

For example, sending change information may include sending presentation information for presenting to the operator/user, via a presentation device, a user interface element to allow the operator to provide input for changing operational information to change a particular operation performed by an automotive vehicle. For example, presentation information may be presented to the operator of automotive vehicle 502 instructing the operator to activate an outside light of automotive vehicle. The operator may interoperate with a button, knob, and/or other control to provide power to the light, thus altering a constraint on the light of automotive vehicle 502. The change information may be sent in response to PED 504 detecting an incoming communication such as phone call and/or in response to detecting an input by PED 504 from the device user.

In another aspect, change information may be sent to automatically change operational information of an automotive vehicle. In the example, the previous paragraph, an operation director component 408 in one or more of FIGS. 4a-c may send change information to a fuel control component (not shown) and/or a braking component (not shown) in automotive vehicle 502 to reduce the speed at which automotive vehicle 502 is traveling in operating to move automotive vehicle 502 in space.

In yet another aspect, when a communication including the user of PED 504 ends, change information may be sent in response to detecting the ending of the communication, to restart, resume, and/or otherwise undo a change resulting from a previous change to operational information of automotive vehicle 502 in response to detecting the communication. For example, change information may identify an instruction as operational information for a cruise control subsystem of automotive vehicle 502 to resume moving at a speed that was changed in response to previously sent change information.

In FIG. 4b, match component 406b may interoperate with operation director component 408b, directly and/or indirectly, in response to detecting that the operator of automotive vehicle 502 is the user of PED 504. Operation director component 408b may identify operational information to change. Automotive vehicle 502 may be performing an operation constrained by the operational information or the change in operational information may alter a constraint for an operation to be performed and/or that may be performed in the future. For example, operation of a dashboard display light may be changed in response to detecting the operation is the user. The light may be changed via a change in operational information, in response to detecting an indication that operator attention has been drawn to PED 504. A light may be brightened or brightness may be varied in a pattern to attract attention from the operator/user.

The change information to be sent may be pre-specified in a configuration file accessible to operation director component 408b and/or identified in a data structure included in operation director component 408b. For example, the change information may identify a change in operational information for starting automotive vehicle 502 while the user of PED 504 is entering a text message. The change in operational information may disable starting automotive vehicle 502 or may allow starting but may prevent a transmission of automotive vehicle from engaging a gear to move forward and/or backward.

In an aspect, operation director component 408b may send change information to disable a display device in automotive vehicle 502 to prevent presentation of data while the operator as user of PED 504 is interoperating with PED 504. Alternatively or additionally, a network adapter may be reconfigured by a change in operational information to prevent receiving data to be presented to the operator from a remote node.

In another aspect, operation director component 408b may send presentation information to a presentation device in PED 504 and/or in automotive vehicle 502 to present a message instructing the operator/user to not operate a media player in automotive vehicle 502 while operating PED 504. The presentation information may be and/or may be based on change information and user input to turn off the media player changes operational information for the media player.

In yet another aspect, operation director component 408b may determine an operation to allow an operation and/or to prevent an operation based on an attribute of the operator/user, PED 504, and/or automotive vehicle 502. For example, operation director component 408b may send change information to change operational information to allow automotive vehicle to operate for a specified period of time in response to a voice communication operation performed by PED 504. When the time expires, the operator may be warned, based on the operational information, to stop automotive vehicle 502 or the voice communication will be automatically ended based on an operation providing information about the operation of automotive vehicle 502 to PED 504. Sending change information may be based on any of a number of attributes such an age of the operator, a route of the automotive vehicle, and/or a measure of traffic on a road on which the automotive vehicle is traveling, to name a few examples.

In FIG. 4a, match component 406a may interoperate with operation director component 408a, directly and/or indirectly, in response to detecting that the operator of automotive vehicle 502 is the user of PED 504. Operation director component 408a may identify change information via interoperation with a remote node, such as service node 506. Service node may maintain records identifying change information for changing operational information based on one or more of an operator/user; a type of portable electronic device; an application, a feature, and/or capability of a portable electronic device, and/or an attribute an automotive vehicle. In another aspect, an operation to be changed may be predetermined and pre-specified. Based on change information received from service node 506, operation director component 408b may send change information from PED 504 to change operational information of automotive vehicle 502. PED 504 may send the change information to automotive vehicle 502 via a network included in automotive vehicle 502, via network 508, and/or via a physical link coupling automotive vehicle 502 and PED 504, such as a communications cable and/or a short-range wireless link. In still another aspect, PED 504 may send change information to automotive vehicle 502 indirectly via a proxy node. For example service node 506 may route change information from PED 504 to automotive vehicle 524. A proxy may perform network protocol translation and/or translate data received into a different representation in relaying data between automotive vehicle 502 and PED 504.

Change information may be sent from a portable electronic device to an automotive vehicle to change operational information causing automotive vehicle to instruct the operator, via an output device, to not interact with the portable electronic device as user at all and/or in a particular manner.

Operation director component 408a may change operational information of automotive vehicle 502 causing automotive vehicle 502 to send presentation information to a presentation device in automotive vehicle 502 and/or in PED 504 to present a message instructing the operator/user to not play a game, read a document, and/or not to interact with PED 504 to cause one or more other operations to be performed by PED 504.

In FIG. 4c, match component 406c may interoperate with operation director component 408c, directly and/or indirectly, in response to detecting that the operator of automotive vehicle 502 is the user of PED 504. Operation director component 408c may identify change information via accessing information in policy data store 427c illustrated in FIG. 4c. Policy data store 427c may include predetermined change information for operational information changes that may be made and/or requested. Policy data store 427c may include one or more policies that when evaluated identify one or more operational information changes. A policy in policy data store 427c may be accessed by operation director component 408c based on one or more of an identity of an operator/user, an attribute of an automotive vehicle, a type of portable electronic device, an application and/or other component accessible to a portable electronic device, to name a few examples. Operation director component 408c may send change information identified based on accessing policy data store 427c to PED 504 via network 508 and/or may send change information to PED 504 via automotive vehicle 502. Operation director component 408c may send change information to PED 504 to change operational information. Operation director components 408 operating in automotive vehicle 502 and/or in PED 504 may similarly interoperate with local policy data stores as illustrated by policy data store 427a in FIG. 4a.

Change information may be sent from a service node to an automotive vehicle to change operational information to disable, enable, and/or otherwise change an operation and/or to instruct the operator of the automotive vehicle device not to interact and/or not interact with the automotive vehicle in a manner that causes a particular operation to be performed differently than otherwise. Analogous to operation director component 408a and operation director component 408b, operation director component 408c may send presentation information to a presentation device in automotive vehicle 502 and/or in PED 504 to present a message instructing the operator/user to change operational information of automotive vehicle 502.

Change information may be sent when it is determined that the operator is currently operating the automotive vehicle and/or the portable electronic device is currently performing an operation in response a detected input from the user. The change information, in the aspect, is sent in response to determining one or both of the automotive vehicle and the portable electronic device is operating in response to the operator/user.

Alternatively or additionally, change information may be sent prior to detecting the operator is operating the automotive vehicle and/or prior to detecting the user is interacting with the portable electronic device. For example, match component 406c may determine that an operator of automotive vehicle 502 is in a same location as automotive vehicle 502. In an aspect, automotive vehicle 502 may receive a wireless communication to unlock automotive vehicle from a device associated with the operator. Match component 406c may identify one or more portable electronic devices with which the operator is associated as user. Such information may be stored in a data store, such as correlator data store 429c. Operation director component 408c may be invoked to send change information to automotive vehicle 502 for relaying to a component to change operational information for the one or more components in response to activation of a communicative coupling between automotive vehicle 502 and the one or more portable electronic devices.

Additionally or alternatively, operation director component 408c may send change information via network 508 to automotive vehicle 502 as specified by one or more policies accessed via policy data store 427c. The arrangement of components in FIG. 4a and in FIG. 4b may be adapted to analogously to send change information during and/or prior to an operation of automotive vehicle 502 and/or PED 504.

In still another aspect, change information may be sent when it is determined that the operator is an owner of the vehicle and/or that the user is an owner of the portable electronic device. The change information may be sent in response to determining one or more of the ownership relationships exist between the operator and automotive vehicle 502 and PED 504. Determining that an operator and/or user is an owner may be included in detecting whether the operator is the user. A match component 406 may be configured to determine whether an ownership relationship exists. Detecting that an operator and/or user is an owner may be included in sending change information apart from determining that the owner is the user. An operation director component 408 may be configured to determine whether an ownership relationship exists.

In another aspect, change information may provide and/or otherwise identify an indication changing operational information for altering an amount of power available to a component included in performing a specified operation. For example change information may instruct operation director component 408a to change operational information to place some of the components of automotive vehicle 502 or all of automotive vehicle 502 in an immobile state, to limit the speed of automotive vehicle 502, limit a distance that can be traveled by automotive vehicle 502, and/or change power available to a component. For example, operation director component 408a may disable a network adapter from receiving route data via a network by changing operational information to cut power to a component for processing received data. The network adapter may be prevented from performing a receive operation by changing operational information to prevent access by the network adapter to memory buffers for storing received data, in an aspect.

Change information may sent to change operational information to alter a constraint for an operation for one or more of accelerating, controlling speed, braking, turning, providing light, signaling another operator of another vehicle, presenting information to the operator of the automotive vehicle, providing power to an engine and/or other component, changing an ambient condition in a compartment of the automotive vehicle, operating a window wiper, operating a mirror, operating a media player, operating a navigation system, operating a steering control system, operating a seat, operating a heater, operating a transmission system, a operating tire pressure system, altering an aerodynamic attribute of the automotive vehicle, operating a window, operating a door, and operating a lid of a compartment.

Alternatively or additionally, current operational information may include a security attribute associated with a resource accessed in performing a particular operation by an automotive vehicle. For example, change information may instruct operation director component 408a to change a role, a group, and/or permission for a resource preventing automotive vehicle 502 from accessing data, software, and/or hardware included in performing a specified operation. For example, operation director component 408a may change a file permission for accessing a map preventing automotive vehicle 502 from presenting the map to the operator.

In yet another aspect, change information may be sent in response to detecting attention or lack of attention of the user/operator directed to operating automotive vehicle 502 and/or directed to interacting with PED 504. In FIG. 4b, capability subsystem 403b may subscribe to input driver 423b and/or a proxy for input driver to detect user input while the user is operating automotive vehicle 502. An operation director component, such as operation director component 408b, may be configured to determine that the user is attentive to PED 504 in response to input detected by input driver 432b. In response to an input and/or in response to detecting that an attention criterion is met, operation director component 408b may send change information to change operational information to enable an operation for presenting an output, by automotive vehicle 502b, to direct attention of the operator to operating automotive vehicle 502.

For example, a touch screen of a mobile device, such as mobile phone and/or tablet computing device, in automotive vehicle 502 may detect a touch input. The operator of automotive vehicle 502 may be logged into the mobile device. The mobile device may include a network interface component such as an 802.11 wireless adapter and/or a BLUETOOTH® adapter. The device may send interaction information to safety service 403c in service node 506 via network 508 and/or may send interaction information to attention subsystem 403a in FIG. 4a via a personal area network (PAN) and/or a wired connection to automotive vehicle 502. In response to receiving interaction information and/or in response to detecting that an attention criterion is met based on the received interaction information, operation director component 408c and/or operation director component 408b may send change information to change operational information to alter a constraint on a specified operation of automotive vehicle 502.

The method illustrated in FIG. 2 may include additional aspects supported by various adaptations and/or analogs of the arrangement of components in FIG. 3. For example, in various aspects, receiving vehicle information and/or receiving device information may include receiving a message as a response to a request in a previously sent message as described above. In addition, as described above, receiving vehicle information and/or receiving device information may include receiving a message transmitted asynchronously.

Vehicle information may identify an operator based on an operation performed by an automotive vehicle in response to an input received by the automotive vehicle from the operator. For example, an operator identity component 402 in FIGS. 4a-c may receive vehicle information, in response to an input by an operator to instruct automotive vehicle 502 to accelerate. In another example, an operation, such as detecting a button press sequence by an operator may detect an identifier of the operator input via the button press sequence.

Device information may indicate that a portable electronic device is operating in response to a detected input from a user. Vehicle information may identify the operator as an owner of the vehicle and/or device information may identify a user of a portable electronic device as an owner of the portable electronic device.

Vehicle information for an automotive vehicle and/or device information for a portable electronic device may include, identify, and/or otherwise be based on one or more of interaction information, a personal identification number (PIN), a hardware user identifier, an execution environment user identifier, an application user identifier, a password, a digital signature that may be included in a digital certificate, a user communications address of a communicant in a communication, a network address (e.g. a MAC address and/or an IP address), device identifier, a manufacturer identifier, a serial number, a model number, an ignition key, a detected start event, a removable data storage medium, a particular communications interface included in communicatively coupling the automotive vehicle and the portable electronic device, an ambient condition, geospatial information for the automotive vehicle, the operator, the user, and/or the portable electronic device, another occupant of the automotive vehicle, another portable electronic device, a velocity of the automotive vehicle, an acceleration of the automotive vehicle, a topographic attribute of a route of the automotive vehicle, a count of occupants in the automotive vehicle, a measure of sound, a measure of attention of at least one of the operator and the user, an attribute of another automotive vehicle, and an operational attribute of the automotive vehicle (e.g. tire pressure, weight, centrifugal force, and/or deceleration). Detecting that an operator is a user and/or sending change information may be performed in response to receiving and/or otherwise based on one or more of the elements listed in the previous sentence.

For example, detecting that an operator is a user may be performed during specified times, such as after dark, identified by temporal information. Sending change information may be performed in response to determining the operator has been interacting with PED 504 for a specified period of time identified in received temporal information. Detecting that an operator is a user and/or sending change information may be performed only for certain devices and/or device types, in some aspects. One or more of the elements of the method illustrated in FIG. 2 may be performed only under particular ambient conditions, such as rain or snow that require a more attentive operator. An operator's driving experience, physical, and/or mental capabilities and/or limitations may affect when one or more of the elements in the method are performed. Things that affect the amount of attention needed from an operator to operate an automotive vehicle may affect when some or all of the method illustrated in FIG. 2 is performed in various aspects of the arrangement in FIG. 3. For example, some or all of the method may be performed in response to the presence of a child as an occupant of an automotive vehicle.

Exemplary communication addresses include a phone identifier (e.g. a phone number), an email address, an instant message address, a short message service (SMS) address, a multi-media message service (MMS) address, an instant message address, a presence tuple identifier, and a video user communications address. A user user communications address may be identified by an alias associated with the user communications address. For example, a user communications address may be located in an address book entry identified via an alias. An alias may be another user communications address for the user.

Vehicle information for an automotive vehicle and/or device information for a portable electronic device may be received in response to detecting one or more of a request to perform a particular operation, a performing of a particular operation, wherein the operation is to be performed and/or is being performed by the automotive vehicle and/or the portable electronic device.

One or more of vehicle information for an automotive vehicle and/or device information for a portable electronic device may be received by one or more of the automotive vehicle, the portable electronic device, and another node, where the other node is communicatively-coupled, directly and/or indirectly, to at least one of the automotive vehicle and the portable electronic device. Vehicle information may be received, via a network, by the portable electronic device and/or the other node. Device information may be received, via the network, by the automotive vehicle and the other node.

Detecting that an operator of an automotive vehicle is a user of a portable electronic device may be based on one or more of a interaction information, personal identification number (PIN), a hardware user identifier, an execution environment user identifier, an application user identifier, password, a digital signature that may be included in a digital certificate, a user communications address, a network address, device identifier, a manufacturer identifier, a serial number, a model number, a ignition key, a detected start event, a removable data storage medium, a particular communications interface included in communicatively coupling the automotive vehicle and the portable electronic device, temporal information, an ambient condition, geospatial information for the automotive vehicle, the operator, the user, the portable electronic device, another occupant of the automotive vehicle, a velocity of the automotive vehicle, an acceleration of the automotive vehicle, a topographic attribute of a route of the automotive vehicle, a count of occupants in the automotive vehicle, a measure of sound, a measure of attention of at least one of the operator and the user, an attribute of another automotive vehicle, and an operational attribute of the automotive vehicle.

As described above, detecting that an operator of an automotive vehicle is a user of a portable electronic device and/or sending change information may be performed in response to interaction information detected by a sensor that may be integrated into an automotive vehicle or into a portable electronic device, such as a mobile phone and/or a media player that is in the automotive vehicle but not part of the automotive vehicle. The sensor may detect one or more of an eyelid position, an eyelid movement, an eye position, an eye movement, a head position, a head movement, a substance generated by at least a portion of a body of the occupant, a measure of verbal activity, a substance taken in bodily by the occupant. For example, interaction information may be received based on input detected by sensor such as a breathalyzer device that may identify and/or that may be included in determining a measure of visual attention based on blood-alcohol information included in and/or identified by the interaction information.

Exemplary operations for which change information may be sent in response to include one or more of presenting output to the user, receiving input from the user, receiving a message included in a communication including the user as a communicant, and sending a message included in a communication including the user a communicant.

One or more of detecting that an operator of an automotive vehicle is a user of a portable electronic device and sending change information may be performed in response to and/or otherwise based on one or more of an attribute of an occupant of the automotive vehicle, a count of occupants in the automotive vehicle, an attribute of the automotive vehicle, an attribute of an object in a location including the automotive vehicle, a speed of the automotive vehicle, a direction of movement of the automotive vehicle, a movement of a steering mechanism of the automotive vehicle, an ambient condition, a topographic attribute of a location including the automotive vehicle, a road, information from a sensor external to the automotive vehicle, and information from a sensor included in the automotive vehicle. For example, operation director 408*a* operating in automotive vehicle 502 may determine whether to send change information based on a location of automotive vehicle 502. The change information may be sent based on a classification of the topography of the location.

Change information may be specified based on an attribute of a data entity, such as a data entity's content type. For example, information for modifying operational information for accessing navigation information may be provided based on, for example, one or more MIME types identifying content types includable in navigation information. Change information may identify a content type with a MIME type identifier, a file extension, a content type key included in a data entity, a detectable data structure in a data entity, and a source of a data entity. Exemplary sources that may be identified include nodes accessible via network, a folder in a file system, an application, a data storage device, a type of data such as an executable file, and a data storage medium.

Alternatively or additionally, change information may be specified based on one or more of an identifier of an executable, a process, a thread, a hardware component identifier, a location in a data storage medium, a software component, a universal resource identifier (URI), a MIME type, an attribute of a user interaction included in performing an operation affected by the change information, a network address, a protocol, a communications interface, a content handler component, and a command line. An identifier of an attribute of a user interaction may be based on a type of user sensory activity. A user sensory activity may include at least one of visual activity, tactile activity, and auditory activity. In still another aspect, an identifier of an attribute of a user interaction may be identified based on an input device and/or an output device included in the user interaction.

The method illustrated in FIG. 2 may further include detecting that the user of a portable electronic device is no longer an operator of an automotive vehicle. In response, change information may be sent to change previously modified operational information to allow a specified operation to be performed as it previously was performed.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more instruction-processing units, or by a combination of both. The description herein of any sequence of actions is not intended to imply that the specific order described for performing that sequence must be followed.

Moreover, the methods described herein may be embodied in executable instructions stored in a computer readable medium for use by or in connection with an instruction execution machine, system, apparatus, or device, such as a computer-based or processor-containing machine, system, apparatus, or device. As used herein, a "computer readable medium" may include one or more of any suitable media for storing the executable instructions of a computer program in one or more of an electronic, magnetic, optical, electromagnetic, and infrared form, such that the instruction execution machine, system, apparatus, or device may read (or fetch) the instructions from the computer readable medium and execute the instructions for carrying out the described methods. A non-exhaustive list of conventional exemplary computer readable media includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), and a Blu-ray™ disc; and the like.

Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating that any non-claimed element is essential to the practice of the subject matter as claimed.

I claim:

1. A method for managing operation of an automotive vehicle, the method comprising:
    receiving first information about an automotive vehicle that indicates at least one aspect of automobile vehicle movement, wherein the automotive vehicle has a current operational configuration for allowing a first operation of the automotive vehicle;
    receiving second information about a portable electronic device;
    determining whether the automotive vehicle and the portable electronic device are at least capable of being communicatively coupled via at least one of a communications interface, a network port, or a protocol; and
    sending, in response to receiving the first information about the automotive vehicle that indicates the at least one aspect of the automobile vehicle movement, change information to change the current operational configuration to alter a constraint on the first operation of the automotive vehicle, which results in disabling at least one aspect of a display device of the automotive vehicle and preventing a device user of the portable electronic device from accessing functionality that utilizes a network interface of the automotive vehicle.

2. A computer program product embodied on a non-transitory computer readable medium, comprising:
    code for receiving first information about an automotive vehicle that indicates at least one aspect of automobile vehicle movement, wherein the automotive vehicle has a current operational configuration for allowing a first operation of the automotive vehicle;
    code for receiving second information about a portable electronic device;
    code for determining whether the automotive vehicle and the portable electronic device are at least capable of being communicatively coupled via at least one of a communications interface, a network port, or a protocol; and
    code for sending, in response to receiving the first information about the automotive vehicle that indicates the at least one aspect of the automobile vehicle movement, change information to change the current operational configuration to alter a constraint on the first operation of the automotive vehicle, which results in disabling at least one aspect of a display device of the automotive vehicle and preventing a device user of the portable electronic device from accessing functionality that utilizes a network interface of the automotive vehicle.

3. The computer program product of claim 2 wherein the computer program product is operable such that the at least one aspect of automobile vehicle movement relates to at least one of a rate of acceleration, a speed, or a direction.

4. The computer program product of claim 2 wherein the computer program product is operable such that the at least one of the communications interface, the network port, or the protocol includes the communications interface.

5. The computer program product of claim 2 wherein the computer program product is operable such that the at least one of the communications interface, the network port, or the protocol includes the protocol.

6. The computer program product of claim 2 wherein the computer program product is operable such that the first information includes vehicle information.

7. The computer program product of claim 2 wherein the computer program product is operable such that the second information includes device information.

8. The computer program product of claim 2 wherein the computer program product is operable such that the determining whether the automotive vehicle and the portable electronic device are at least capable of being communicatively coupled includes determining whether the automotive vehicle and the portable electronic device are communicatively coupled.

9. The computer program product of claim 2 wherein the computer program product is operable such that the change information is sent as a function of the determining whether the automotive vehicle and the portable electronic device are at least capable of being communicatively coupled.

10. The computer program product of claim 2 wherein the computer program product is operable for detecting that an operator of the automotive vehicle is the device user of the portable electronic device.

11. The computer program product of claim 2 wherein the computer program product is operable such that the disabling the at least one aspect of the display device includes preventing, at least in part, presentation of data.

12. The computer program product of claim 2 wherein the computer program product is operable such that the network interface includes a network adapter.

13. The computer program product of claim 2 wherein the computer program product is operable such that the network interface includes a network interface for interfacing a personal area network.

14. The computer program product of claim 2 wherein the computer program product is operable such that the functionality involves receiving data.

15. The computer program product of claim 2 wherein the computer program product is operable such that the functionality involves receiving data from a service node.

16. The computer program product of claim 2 wherein the computer program product is operable such that the functionality involves text messaging.

17. The computer program product of claim 2 wherein the computer program product is operable such that the current operational configuration is changed automatically.

18. The computer program product of claim 2 wherein the computer program product is operable such that the current operational configuration is changed based on a type of the portable electronic device.

19. The computer program product of claim 2 wherein the computer program product is operable such that the current operational configuration is changed based on a capability of the portable electronic device.

20. The computer program product of claim 2 wherein the computer program product is operable such that the current operational configuration is changed based on an application of the portable electronic device.

21. The computer program product of claim 2 wherein the computer program product is operable such that the current operational configuration is changed to prevent interaction with the portable electronic device by the device user.

22. The computer program product of claim 2 wherein the computer program product is operable such that the current operational configuration is changed to prevent one or more operations from being performed by the portable electronic device.

23. The computer program product of claim 2 wherein the computer program product is operable such that the functionality utilizes at least one of the communications interface, the network port, or the protocol.

24. An apparatus, comprising:
a component configured for use in an automobile vehicle, the component configured for:
receiving first information about an automotive vehicle that indicates at least one aspect of automobile vehicle movement, wherein the automotive vehicle has a current operational configuration for allowing a first operation of the automotive vehicle;
receiving second information about a portable electronic device;
determining whether the automotive vehicle and the portable electronic device are at least capable of being communicatively coupled via at least one of a communications interface, a network port, or a protocol; and
sending, in response to receiving the first information about the automotive vehicle that indicates the at least one aspect of the automobile vehicle movement, change information to change the current operational configuration to alter a constraint on the first operation of the automotive vehicle, which results in disabling at least one aspect of a display device of the automotive vehicle and preventing a device user of the portable electronic device from accessing functionality that utilizes a network interface of the automotive vehicle.

* * * * *